United States Patent
Letterneau

(10) Patent No.: US 8,683,870 B2
(45) Date of Patent: Apr. 1, 2014

(54) SENSOR DEVICE WITH STEPPED PADS FOR CONNECTIVITY

(75) Inventor: James C. Letterneau, Ladera Ranch, CA (US)

(73) Assignee: Meggitt (Orange County), Inc., Irvine, CA (US)

( * ) Notice: Subject to any disclaimer, the term of this patent is extended or adjusted under 35 U.S.C. 154(b) by 188 days.

(21) Appl. No.: 13/420,915

(22) Filed: Mar. 15, 2012

(65) Prior Publication Data
US 2013/0239696 A1    Sep. 19, 2013

(51) Int. Cl.
*G01B 7/16*    (2006.01)
*G01L 1/00*    (2006.01)

(52) U.S. Cl.
USPC .......................................................... 73/777

(58) Field of Classification Search
USPC ................ 73/777; 174/71 R, 72 R, 255, 260; 361/627, 637, 650, 823, 826
See application file for complete search history.

(56) References Cited

U.S. PATENT DOCUMENTS

| | | | |
|---|---|---|---|
| 1,685,847 A * | 10/1928 | Huntington | 439/482 |
| 4,055,737 A * | 10/1977 | Rasmussen | 200/51 R |
| 4,430,895 A | 2/1984 | Colton | |
| 4,516,189 A * | 5/1985 | Seaks, Jr. | 361/823 |
| 8,426,244 B2 * | 4/2013 | Hollis | 438/107 |
| 8,456,856 B2 * | 6/2013 | Lin et al. | 361/783 |
| 2001/0023615 A1 | 9/2001 | Matsumoto et al. | |
| 2006/0109368 A1 | 5/2006 | Ayrenschmalz et al. | |
| 2007/0132109 A1 | 6/2007 | Jacobsen et al. | |
| 2011/0174076 A1 | 7/2011 | Classen et al. | |
| 2011/0256652 A1 | 10/2011 | Guo et al. | |

OTHER PUBLICATIONS

Kurtz et al. "Ultra High Temperature, Miniature, SOI Sensors for Extreme Environments" Presented at the IMAPS International HiTEC 2004 Conference Santa Fe, New Mexico, May 17-20, 2004, Retrieved online Mar. 18, 2013 at <http://www.kulite.jp/docs/technical_papers/UltraHighTemp.pdf>.

Xu, "IC-Integrated Flexible Shear-Stress Sensor Skin" Journal of Microelectromechanical Systems, vol. 12, No. 5, Oct. 2003, Retrieved online on Mar. 18, 2013 at <http://authors.library.caltech.edu/1271/1/XUYjms03.pdf>.

* cited by examiner

*Primary Examiner* — Lisa Caputo
*Assistant Examiner* — Roger Hernandez-Prewitt
(74) *Attorney, Agent, or Firm* — Dickstein Shapiro LLP

(57) ABSTRACT

A sensor device includes at least one sensor device coupled to a substrate. A solder pad interface includes a plurality of steps, with at least a portion of the steps positioned at different planes, each of a step having a solder pad. A cable with a plurality of cable leads, is configured for each of a cable lead to be coupled to a solder pad.

19 Claims, 4 Drawing Sheets

SENSOR DEVICE WITH STEPPED PADS FOR CONNECTIVITY

BACKGROUND

1. Field of the Invention

The present invention relates generally to devices for the test and measurement market, and more particularly to sensors which have stepped pads for connectivity.

2. Description of the Related Art

Technological advancements have propelled the growth of sensors in the test and measurement space, and manufacturing environments routinely uses sensor-based test and measurement instruments to ensure quality production. The development of high-value resistor kits allows the unhampered use of high-impedance sensors for accurate measurements without interference from external noise, solder-flux residue, particle tracking, bias currents, and distant charges that can make repeatable measurements difficult.

There are a wide variety of devices used in test and measurement. One type of device often used is a sensor, including but not limited to, an accelerometer, pressure sensor, optical sensor and the like. In the test and measurement marketplace, a smaller footprint of the test and measurement device is highly desirable. A smaller size device is less disruptive/intrusive to the unit under test and/or allows more units (uni-axial or tri-axial) to be placed on the article under observation.

As a non-limiting example, a suitable sensor is an accelerometer which behaves as a damped mass on a spring. When the accelerometer experiences an acceleration, the mass is displaced to the point that the spring is able to accelerate the mass at the same rate as the casing. The displacement is then measured to give the acceleration.

In commercial devices, piezoelectric, piezoresistive and capacitive components are commonly used to convert the mechanical motion into an electrical signal. Piezoelectric accelerometers rely on piezoceramics (e.g. lead zirconate titanate) or single crystals (e.g. quartz, tourmaline). Piezoresistive accelerometers are often used in high shock applications. Capacitive accelerometers typically use a silicon micro-machined sensing element. Their performance is superior in the low frequency range and they can be operated in servo mode to achieve high stability and linearity.

Modern accelerometers are often small micro electro-mechanical systems (MEMS) and can consist of little more than a cantilever beam with a proof mass (also known as seismic mass). Damping results from the residual gas sealed in the device. As long as the Q-factor is not too low, damping does not result in a lower sensitivity.

Under the influence of external accelerations the proof mass deflects from its neutral position. This deflection is measured in an analog or digital manner. Most commonly, the capacitance between a set of fixed beams and a set of beams attached to the proof mass is measured. This method is simple, reliable, and inexpensive. Integrating piezoresistors in the springs to detect spring deformation, and thus deflection, is a good alternative, although a few more process steps are needed during the fabrication sequence. For very high sensitivities quantum tunneling is also used; this requires a dedicated process making it very expensive. Optical measurement has been demonstrated on laboratory scale.

Another, far less common, type of MEMS-based accelerometer contains a small heater at the bottom of a very small dome, which heats the air inside the dome to cause it to rise. A thermocouple on the dome determines where the heated air reaches the dome and the deflection off the center is a measure of the acceleration applied to the sensor.

Most micromechanical accelerometers operate in-plane, that is, they are designed to be sensitive only to a direction in the plane of the die. By integrating two devices perpendicularly on a single die a two-axis accelerometer can be made. By adding an additional out-of-plane device three axes can be measured. Such a combination may have much lower misalignment error than three discrete models combined after packaging.

Irrespective of the type of device, there is a need for devices in the test and measurement market, particularly for sensors, which have smaller footprints.

SUMMARY OF THE INVENTION

An object of the present invention is to provide a device suitable for the test and measurement market which has a reduced size.

Another object of the present invention is to provide improved devices for the test and measurement market which are smaller in size, and less disruptive to the unit under test.

A further object of the present invention is to provide improved devices for the test and measurement market with reduced size and allow for more units to be placed on an article under observation.

Yet another object of the present invention is to provide improved devices for the test and measurement market, particularly sensors, which have stacked contact pads for connectively.

These and other objects are achieved in a sensor device that includes at least one sensor device coupled to a substrate. A solder pad interface includes a plurality of steps, with at least a portion of the steps positioned at different planes, each of a step having a solder pad. A cable with a plurality of cable leads, is configured for each of a cable lead to be coupled to a solder pad.

BRIEF DESCRIPTION OF THE DRAWINGS

Show 4 illustrates an embodiment of the present invention illustrating how cable leads find their positions on the stairsteps

DETAILED DESCRIPTION OF THE PREFERRED EMBODIMENTS

Figure 1A:
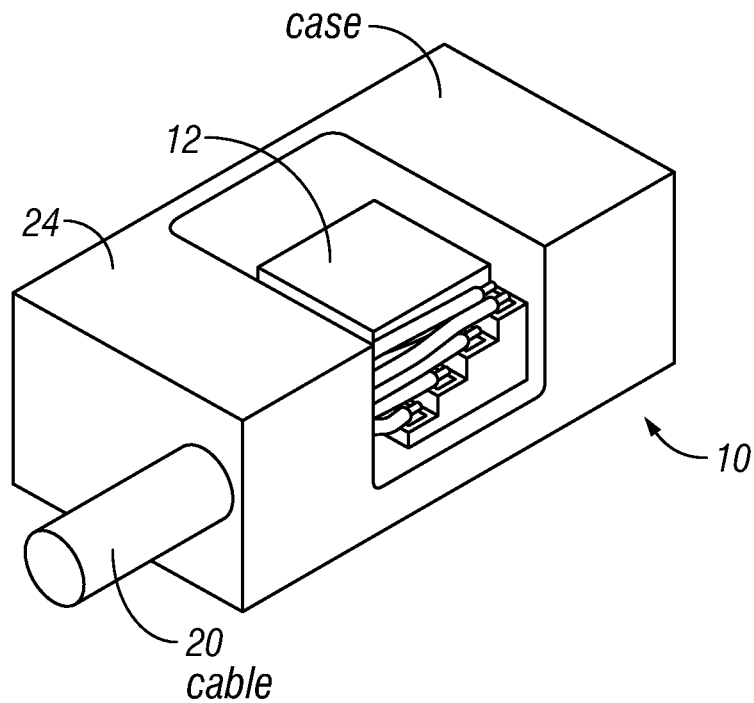
FIG. 1 illustrates one embodiment of a sensor device of the present invention.
Figure 1B:
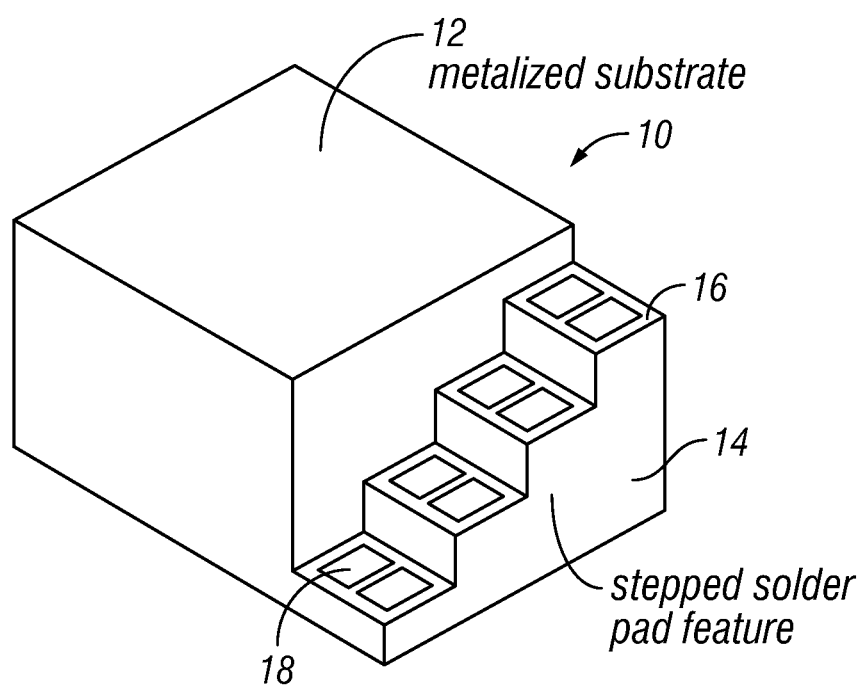

Referring now to FIGS. 1(a) and 1(b), one embodiment of the present invention is a sensor device 10 with a substrate 12 and at least one sensor 13 (FIG. 2) coupled to the substrate 12. A solder pad interface 14 is provided that includes a plurality of steps 16. At least a portion of the steps 16 are positioned at different planes, each of a step 16 having a solder pad 18. In one embodiment, all of the steps 16 are at different levels. A cable 20, with a plurality of cable leads 22, is coupled to the solder pad interface 14, with each of a cable lead being coupled to a solder pad 18.

In one embodiment, the interface 14 is a metalized substrate.

The cable leads 22 are in a stacked geometric configuration when coupled with the solder pads 18. The sensor device 10 has a package seize of about wherein the sensor device 10 has a package with an area in the range of 0.04 in$^2$ [0.26 cm$^2$] to 5.4 in$^2$ [35 cm$^2$] and a volume within the range of 0.003 in$^3$ [0.05 cm$^3$] to 8.1 in$^3$ [133 cm$^3$]. The solder pad interface 14 is configured to minimize a volumetric space between the cable leads 22 and the solder pad interface 14, and minimize a volume between cable 20 and wire, and solder pad interface 14.

In one embodiment, the sensor 13 is a triaxial sensor. The sensor device 10 has a same footprint area of a single axis sensor 13. This provides for a sensor device 10 with a reduced size.

In one embodiment, the solder pad interface 14 is integral with the substrate. In one embodiment, the solder pad interface 14 is a high temperature ceramic interface 14. In various embodiments, the solder pad interface 14 can be a PC board, and the like.

In one embodiment, the solder pad interface 14 has a first series of steps 16 on a first side and a second series of steps 16 on an opposing second side. In another embodiment, all of the steps 16 are on the same side, and they continue in an upward direction. In one embodiment, the distance between each step 16 is the same. In other embodiments, the distances between steps 16 can be different.

In one embodiment, the sensor device 10 includes at least two solder pad interfaces 14 each with a plurality of steps 16. All or a portion the steps 16 are at different planes and each has an associated solder pad 18.

In one embodiment, the sensor device 10 includes three sensors 13.

As non-limiting examples, the sensor 13 can be selected from at least one of, where the sensor 13 is selected from at least one of acoustic, electrical, position, pressure, thermal, piezoresistive, accelerometer and photo.

As a non-limiting example, the sensor 13 can be as disclosed in U.S. Pat. No. 4,430,895, incorporated herein by reference. The sensor 13 can include, a central pedestal support portion coupled to the substrate; an elastic semiconductor diaphragm portion coupled to and peripherally surrounding the central pedestal support portion and extending generally parallel to the substrate; a mass portion coupled to and peripherally surrounding the diaphragm portion and spaced from the substrate, where the mass portion being movable in response to acceleration to cause bending movement of the diaphragm portion; and the sensor 13 is coupled to the diaphragm portion for detecting strain induced in the diaphragm portion in response to bending movement of the diaphragm portion for providing an output signal.

The sensor device 10 can be positioned in an interior of a housing 24. The housing 24 includes a port for receiving the cable 20.

Figure 2:
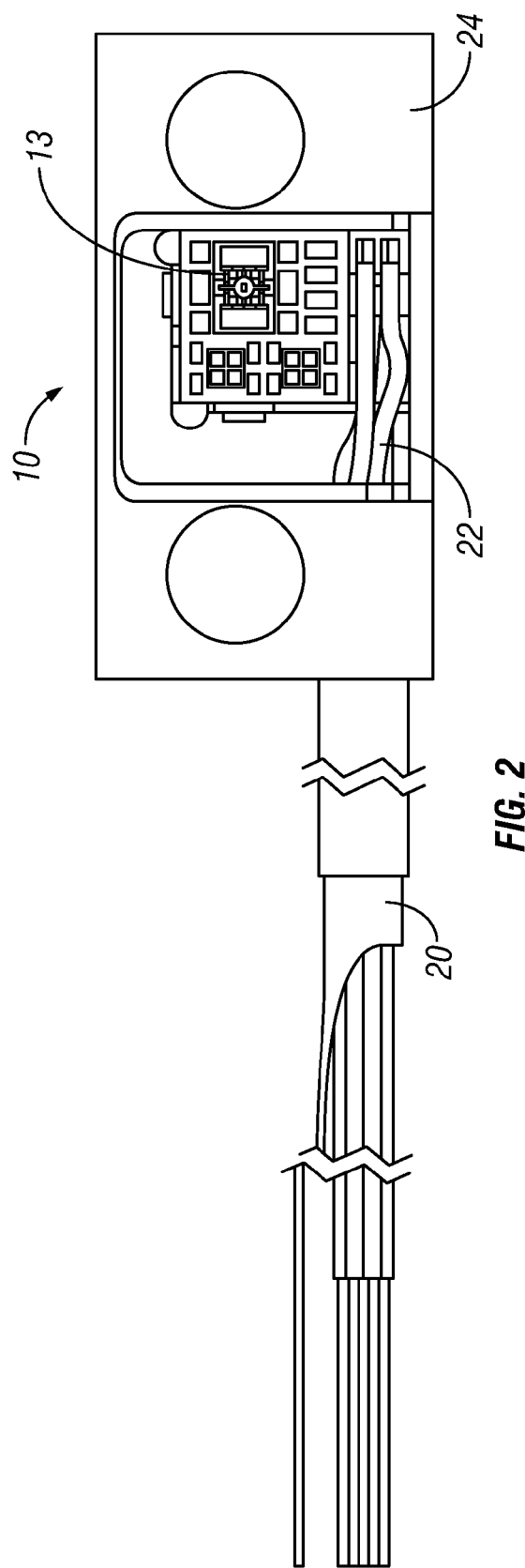
FIG. 2 a top view of the FIG. 1 sensor device.

FIG. 2 a top view of the sensor device 10, looking down on the substrate. In this embodiment, three sensors 13 are provided. One sensor 13 is on the top, the other two are at side surface. This illustrates making a triaxial sensor 13 as a single axial sensor footprint.

Figure 3:
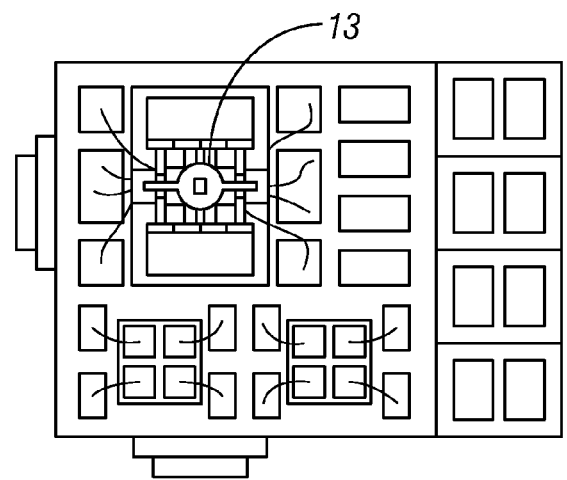
In FIG. 3 illustrates an embodiment of the present invention with wire-bonding of sensors to a substrate.

In FIG. 3, wire-bonding the sensors 13 to the substrate 12 is illustrated.

Figure 4:
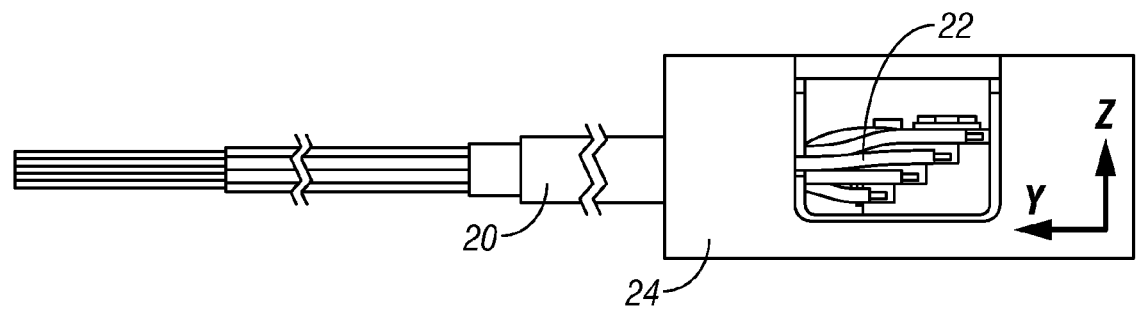

FIG. 4 illustrates how the cable leads 22 find their homes on the stairsteps.

Figure 5:
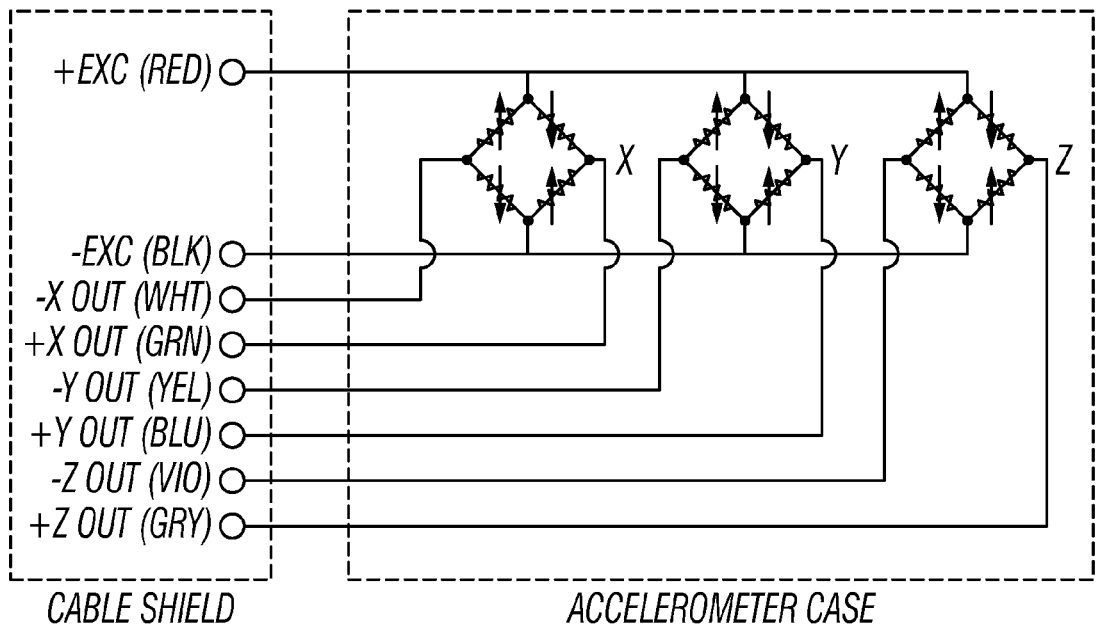
FIG. 5 is a schematic illustrating a connection from each sensor to a cable of the present invention.
Figure 6:
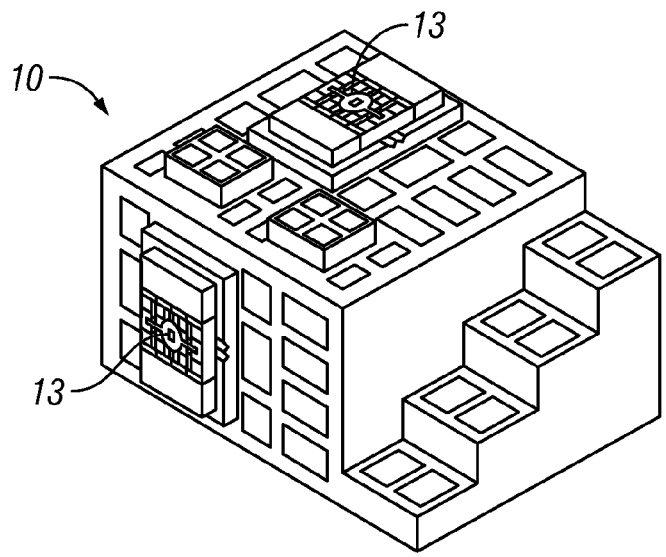
FIG. 6 illustrates an embodiment sensor device with two sensors positioned on different sides.

FIG. 5 is a schematic illustrating the connection from each sensor 13 to the cable 20. FIG. 6 illustrates the sensor device 10 with two sensors 13 positioned on different sides.

Other embodiments of the invention will be apparent to those skilled in the art from consideration of the specification and practice of the invention disclosed herein. It is intended that the specification and examples be considered as exemplary only, with a true scope and spirit of the invention being indicated by the appended claims.

The invention claimed is:

1. A sensor device, comprising:
   a substrate;
   at least one sensor coupled to the substrate; and
   a solder pad interface that includes a plurality of steps, with at least a portion of the steps positioned at different planes, each of a step having a solder pad;
   a cable with a plurality of cable leads, each of a cable lead being coupled to a solder pad.

2. The device of claim 1, wherein the cable leads are in a stacked geometric configuration when coupled with the solder pads.

3. The device of claim 1, wherein the device has a package size with an area in the range of 0.04 in$^2$ [0.26 cm$^2$] to 5.4 in$^2$ [35 cm$^2$] and a volume within the range of 0.003 in$^3$ [0.05 cm$^3$] to 8.1 in$^3$ [133 cm$^3$].

4. The device of claim 1, wherein the solder pad interface is configured to minimize a volumetric space between the cable leads and the solder pad interface and minimize a volume between cable and wire, and solder pad interface structure.

5. The sensor device of claim 1, wherein the sensor is a triaxial sensor.

6. The sensor device of claim 5, wherein the sensor has a same footprint area of a single axis sensor.

7. The sensor device of claim 1, wherein the solder pad interface is integral with the substrate.

8. The sensor device of claim 1, wherein the solder pad interface is a high temperature ceramic interface.

9. The sensor device of claim 1, wherein the solder pad interface is a PC board.

10. The sensor device of claim 1, wherein the solder pad interface has a first series of steps on a first side and a second series of steps on an opposing second side.

11. The sensor of claim 1, wherein the sensor includes at least two solder pad interfaces that includes a plurality of steps, with at least a portion of the steps at different planes, each of a step having a solder pad.

12. The sensor device of claim 1, wherein the sensor device includes three sensors.

13. The sensor device of claim 1, where the sensor is selected from at least one of acoustic, electrical, position, pressure, thermal, piezoresistive, accelerometer and photo.

14. The sensor device of claim 1, further comprising:
    a housing with the sensor device positioned in an interior of the housing, the housing include a port for receiving the cable.

15. The sensor device of claim 1, wherein the interface is a metalized substrate.

16. The sensor device of claim 1, further comprising:
    a central pedestal support portion coupled to the substrate;
    an elastic semiconductor diaphragm portion coupled to and peripherally surrounding the central pedestal support portion and extending generally parallel to the substrate;
    a mass portion coupled to and peripherally surrounding the diaphragm portion and spaced from the substrate, the mass portion being movable in response to acceleration to cause bending movement of the diaphragm portion; and
    wherein the sensor is coupled to the diaphragm portion for detecting strain induced in the diaphragm portion in response to bending movement of the diaphragm portion for providing an output signal.

17. The sensor device of claim 16, wherein the mass portion is constructed to move in response to acceleration in each of three orthogonal axes and outputs are provided representing acceleration in each of the three orthogonal axes.

18. The sensor device of claim 16, wherein the substrate is an electrically non-conductive substrate and the support portion, diaphragm portion, and mass portion, are integrally formed from a single piece of semiconductive material.

19. The sensor device of claim 16, wherein the support portion, diaphragm portion, and mass portion are etched from a single piece of semiconductor material.

* * * * *